(12) United States Patent
Sandfort et al.

(10) Patent No.: US 7,298,509 B2
(45) Date of Patent: Nov. 20, 2007

(54) INTERFACING WITH A PRINTER USING A DYNAMIC PRINT PATH

(75) Inventors: Patrick O. Sandfort, Meridian, ID (US); Gregory E. Perkins, Boise, ID (US); Brian D. Griebe, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 952 days.

(21) Appl. No.: 10/102,259

(22) Filed: Mar. 19, 2002

(65) Prior Publication Data

US 2003/0179402 A1 Sep. 25, 2003

(51) Int. Cl.
*G06F 3/12* (2006.01)
*G06K 1/00* (2006.01)

(52) U.S. Cl. .................. 358/1.15; 358/1.13

(58) Field of Classification Search .......... 358/1.15, 358/1.13, 1.14, 1.1, 1.6, 1.16, 1.17, 1.18, 358/407, 468; 709/219, 217, 218, 230, 238, 709/245, 246; 715/500, 522, 523, 524; 347/2, 347/3, 5; 399/1, 8
See application file for complete search history.

(56) References Cited

U.S. PATENT DOCUMENTS

| | | | |
|---|---|---|---|
| 5,580,177 A * | 12/1996 | Gase et al. .................. 400/61 |
| 6,184,998 B1 | 2/2001 | Tebeka | |
| 6,292,267 B1 | 9/2001 | Mori et al. | |
| 6,301,012 B1 * | 10/2001 | White et al. ............... 358/1.15 |
| 6,954,278 B1 * | 10/2005 | Cronch et al. ............ 358/1.15 |
| 2002/0051197 A1 * | 5/2002 | Minegishi .................. 358/1.15 |
| 2002/0114004 A1 * | 8/2002 | Ferlitsch .................... 358/1.15 |
| 2002/0184342 A1 * | 12/2002 | Kennedy et al. ............ 709/219 |
| 2003/0005100 A1 * | 1/2003 | Barnard et al. ............. 709/223 |
| 2005/0179921 A1 * | 8/2005 | Brossman et al. ........ 358/1.13 |

OTHER PUBLICATIONS

Braden, R. editor, Requirements for Internet Hosts—Communications Layers, RFC 1122, Internet Engineering Task Force, Oct. 1989.
Braden, R. editor, Requirements for Internet Hosts—Application and Support, RFC 1123, Internet Engineering Task Force, Oct. 1989.
Kennedy et al., United States Patent Application entitled "Port Monitoring Methods and Arrangements for Enhanced Document Distribution," U.S. Appl. No. 09/874,432, filed Jun. 4, 2001 (Related Application).

* cited by examiner

*Primary Examiner*—Dov Popovici (57) ABSTRACT

Various systems, methods, and programs embodied in a computer readable medium for printing using a dynamic print path are provided. In one embodiment, a method is provided that comprises the steps of rendering a document in a computer system into a print ready file without a specification of a destination printer upon which the document is to be printed, specifying the destination printer to which the print ready file is to be transmitted to print the document, and, transmitting the print ready file from the computer system directly to the destination printer using a predefined communications protocol.

27 Claims, 5 Drawing Sheets

INTERFACING WITH A PRINTER USING A DYNAMIC PRINT PATH

BACKGROUND

Print paths that are employed by systems such as Microsoft Windows provided by Microsoft Corporation of Redmond, Wash. are usually statically defined. Static print paths associate a system or network printer with a computer system or other physical device. To print to a system or network printer, a computer system employs a printer specific print driver to render a document into a printer ready file that is compatible with the specified printer. The printer ready file is then provided to a port monitor that is responsible for transmitting the data contained therein to the specified printer. The print path is statically defined in that the printer driver and the port monitor are both predefined for printing to a specific printer.

Statically defined print paths can be burdensome when a user wishes to print to a new printer that is undefined in their computer system. Specifically, in order to print to an undefined printer, a user is required to construct the print path to the new printer identifying the new printer driver, port monitor, and other aspects.

SUMMARY

In light of the foregoing, various embodiments including systems, methods, and programs embodied in a computer readable medium for printing using a dynamic print path are provided. In one embodiment, a method is provided that comprises the steps of rendering a document in a computer system into a print ready file without a specification of a destination printer upon which the document is to be printed, specifying the destination printer to which the print ready file is to be transmitted to print the document, and, transmitting the print ready file from the computer system directly to the destination printer using a predefined communications protocol.

In another embodiment, a program embodied in a computer readable medium is provided that comprises a generic printer driver that renders a document into a print ready file without a specification of a destination printer upon which the document is to be printed. The program also includes a port monitor that writes the print ready file rendered by the generic printer driver to a memory to be transmitted to the destination printer. The program further comprises a print router that facilitates specifying the destination printer from a number of potential destination printers to which the print ready file is to be transmitted to print the document and the print router being capable of directing a data communications protocol suite to transmit the print ready file directly to the destination printer for printing.

In still another embodiment, a system that provides for a dynamic print path with which to interface with a destination printer to print a document is described. In this regard, the system comprises a processor circuit having a processor and a memory. In addition, a dynamic print path is stored in the memory and is executable by the processor. The dynamic print path comprises a generic printer driver that renders a document into a print ready file without a specification of a destination printer upon which the document is to be printed, a port monitor that writes the print ready file rendered by the generic printer driver to a memory to be transmitted to the destination printer, and, a print router that facilitates specifying the destination printer from a number of potential destination printers to which the print ready file is to be transmitted to print the document.

In addition the present invention provides for other embodiments that are described in the discussion below and/or in the claims appended hereto.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
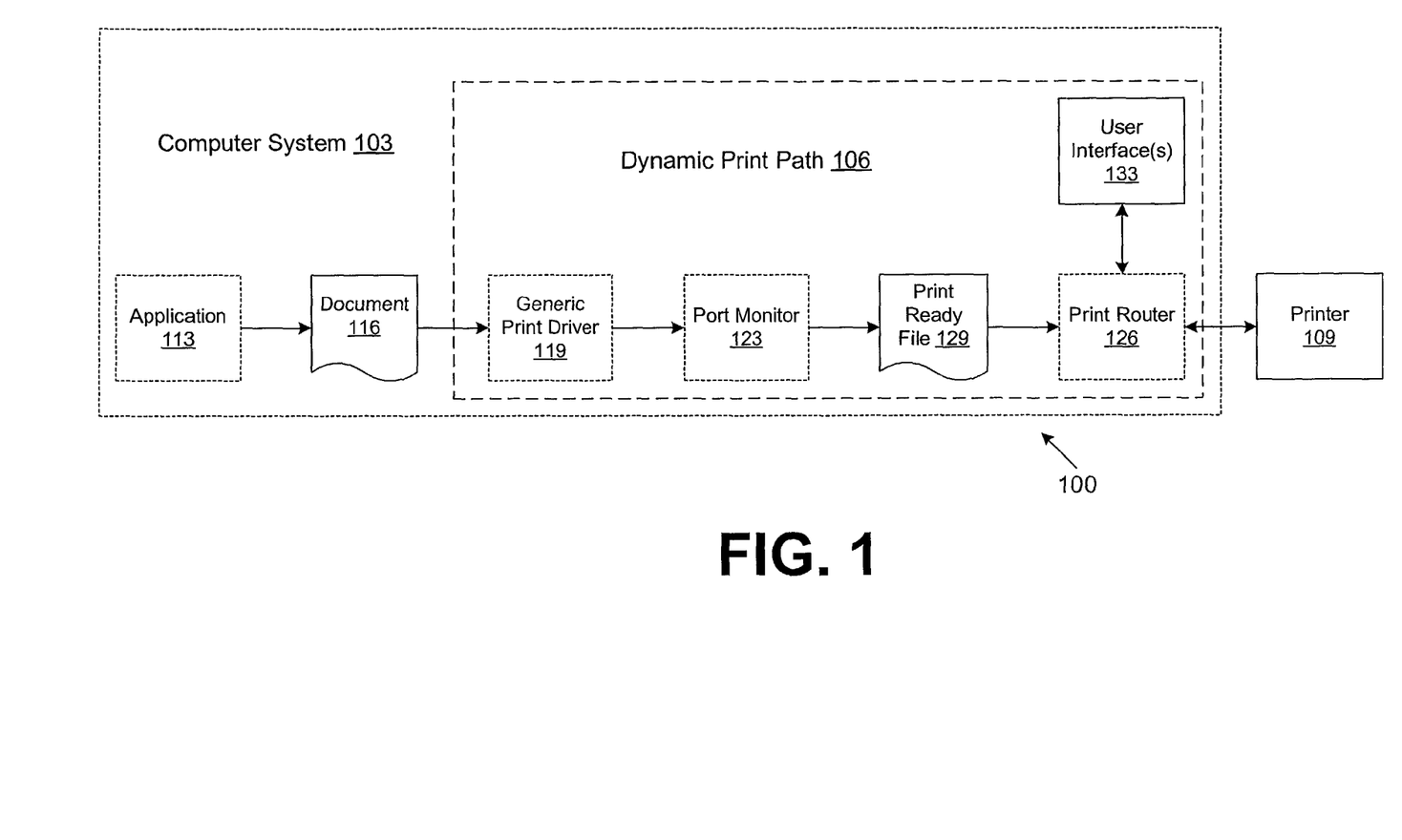
FIG. 1 is a functional block diagram of a dynamic print path according to an embodiment of the present invention.

Turning to FIG. 1, shown is a functional block diagram of a print network 100 that includes various components to perform a print operation according to an embodiment of the present invention. In this respect, the print network 100 includes a computer system 103 with a dynamic print path 106. The computer system 103 may be, for example, a computer, personal digital assistant, or other device with like capability. The computer system 103 is in data communication with a destination printer 109. The computer system 103 includes an application 113 that generates one or more documents 116. For printing, the document 116 is applied to the dynamic print path 106 in order to render the document 116 in a format that is accepted by the destination printer 109. The use of the dynamic print path 106 in the computer system 103 provides an advantage in that the computer system 103 communicates directly with the destination printer 109 without the intervention of a print server or other intermediate device as will be described.

The dynamic print path 106 includes a generic print driver 119, a port monitor 123, and a print router 126. During the course of the operation of the dynamic print path 106, a print ready file 129 is created that comprises the document 116 embodied in a format that is accepted by various printers such as the destination printer 109. During the course of a print operation, one or more user interfaces 133 may be generated by the print router 126 as will be discussed.

Next, the operation of both the computer system 103 and the dynamic print path 106 in performing a print operation is described. To begin, the application 113 generates the document 116 that is to be printed by the printer 109. In this respect, the application 113 may be any application that can generate a document 116. Such applications may include, for example, word processors, drawings programs, or any other application. Once the document 116 is created, a user indicates a desire to print the document 116 using the appropriate mechanisms within the application 113. Such mechanisms may be, for example, print buttons or other user interface components. When initiating the printing of the document 116 using such mechanisms in the application 113, a user may identify that the dynamic print path 106 be employed to render the document for printing. Such may be identified as an alternative to existing printer choices.

Assuming that the dynamic print path 106 is selected, then the document 116 is applied to the generic print driver 119 to be rendered. The generic print driver 119 is "printer generic" in that it is not designed for rendering a document into a print ready format that is associated with or compatible with a specific printer. In this respect, the generic print driver 119 renders the document 116 into the print ready file 129 without a specification of the ultimate destination printer 109 upon which the document is to be printed.

After the print ready file 129 is created, the generic print driver 119 provides the print ready file 129 to the port monitor 123. The port monitor 123 then writes the print ready file 129 to a memory in the computer system 103 for temporary storage before being transmitted to the destination printer 109. This is done since the ultimate destination printer 109 has yet to be selected for printing. The port monitor 123 then informs the print router 126 that the print ready file 129 is to be printed, thereby initiating the functions of the print router 126.

The print router 126 facilitates the selection or specification of the destination printer 109 from a group of potential destination printers 109. Also, the print router 126 directs the transmission of the print ready file 129 to the destination printer 109 using a predefined data communications protocol suite. To begin, the print router 126 facilitates the selection or specification of the printer 109 by generating an appropriate user interface 133. The user interface 133 may provide a user with the opportunity to select the destination printer 109 from a group of potential destination printers or may otherwise allow the user to specify the destination printer 109. The selection or specification of the destination printer 109 may be performed subsequent to the rendering of the document 116 into the print ready file 129 by the generic print driver 119 or may be performed in parallel to the operation of the generic print driver 119. The user interface 133 provides a user with the opportunity not only to specify the printer 109, but also a particular port within the printer 109 that is to be used for data communications during the course of the print operation.

Once the destination printer 109 has been selected or otherwise specified, then the print router 126 queries the destination printer 109 to confirm that the printer 109 is a printer in fact. For example, the destination printer 109 may be coupled to the computer system 103 across a network. In such case, the query may be performed using a Simple Network Management Protocol (SNMP) or some other protocol. If the printer status is confirmed, then the print router 126 queries the printer 109 to confirm that the print ready format of the print ready file 129 generated by the generic print driver 119 is compatible with or is the same as a print ready format 129 required by the printer 109. This query may also be performed using SNMP or other appropriate protocol.

In another embodiment, a translator may be employed that translate the print ready file 129 from the previously rendered print ready format into a print ready format that is compatible with the selected printer 109.

Assuming that the printer 109 can accept the print ready format of the print ready file 129 or that the print ready file 129 was properly translated, then the print router 126 opens a communications channel by opening a socket, for example, with the printer 109 to facilitate data communications. To facilitate the data communication, the print router 126 employs a default port number unless an alternate port number is specified using the user interface 133 as mentioned above. Then, the print router 126 directs the transmission of the print ready file 129 to the destination printer 109 for printing thereon using an appropriate data communications protocol suite. The data communications protocol suite may be, for example, Transmission Control Protocol/Internet Protocol (TCP/IP) as described by Braden, R. editor, Requirements for Internet Hosts—Communications Layers, RFC 1122, Internet Engineering Task Force, October 1989, or other appropriate protocol suite as can be appreciated by those with ordinary skill in the art. Upon receiving the print ready file 129, the printer 109 prints the document 116 embodied therein.

The dynamic print path 106 provides several advantages in that the destination printer 109 is not statically defined where a printer specific print driver is employed. This provides for greater flexibility in use of portable computer systems such as laptops, personal digital assistants, or other devices. For example, in one scenario assume that computer system 103 is a portable computer that is temporarily linked to a local area network and that the user wishes to print a document on a nearby printer coupled to the network. If the print path for this printer were to be statically defined, then the user would have to install the printer specific print driver and an appropriate port monitor on the portable computer. Many users may not have the technical savvy necessary to perform the needed installation procedure or such users may not have the necessary processing privileges to perform the needed installation procedure. Also, users may not wish to perform the needed installation procedure as they may not wish to burden their computer system for a quick, one-time print job.

However, if the dynamic print path 106 exists on their portable computer, the user can initiate a print operation and need only enter the printer IP address or other network designation using the user interface 133 to print the document 116. Ultimately, a print operation may be performed without the need to communicate with a print server associated with the destination printer or other intermediate device since the print router 126 facilitates direct transmission of the print ready file 129 to the destination printer 109 over a network or through some other interconnection.

In addition, each of the various blocks shown in the functional block diagram of FIG. 1 represents a module, object, or other grouping or encapsulation of underlying functionality. However, the same underlying functionality may exist in one or more modules, objects, or other groupings or encapsulations that differ from those shown in FIG. 1 without departing from the present invention as defined by the appended claims.

Figure 2:
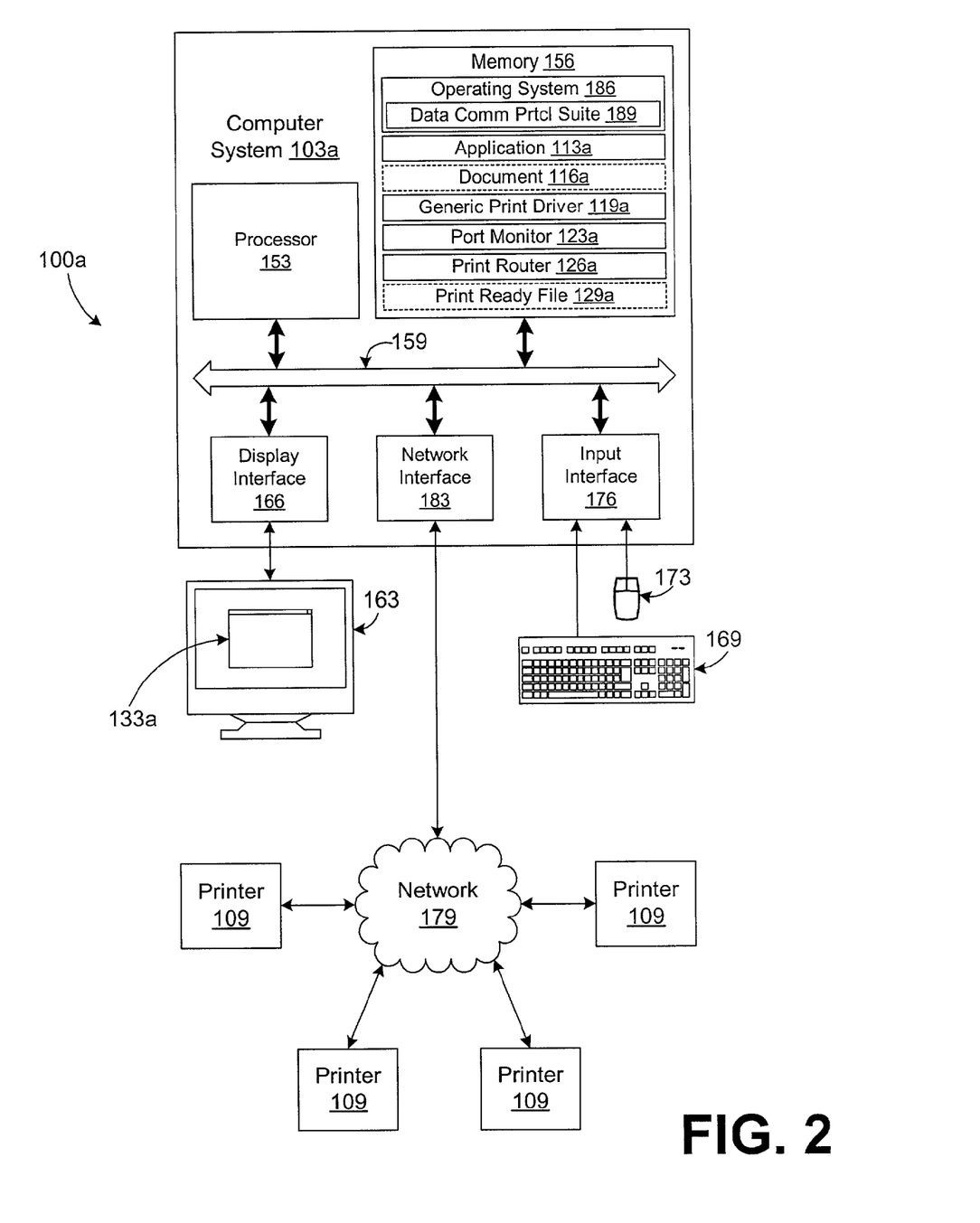
FIG. 2 is a block diagram of a network that includes a computer system that employs the dynamic print path of FIG. 1.

With reference to FIG. 2, shown is an embodiment of the print network 100 denoted herein as print network 100a. The print network 100a includes computer system 103a with a processor circuit having a processor 153 and a memory 156, both of which are coupled to a local interface 159. In this respect, the local interface 159 may be, for example, a data bus with an accompanying control/address bus as can be appreciated by those with ordinary skill in the art. The computer system 103a includes a display device 163 that is coupled to the local interface 159 by virtue of a display interface 166. The computer system 103a also includes a keyboard 169 and a mouse 173, both of which are coupled to the local interface 159 through various input interfaces 176. The computer system 103a may also include other input or output devices as can be appreciated by those with ordinary skill in the art.

The print network 100a also includes a data communications network 179 that is coupled to the local interface through a network interface 183. The display interface 166, input interfaces 176, and network interface 183 may be, for example, interface cards or other suitable circuits as can be appreciated by those with ordinary skill in the art. The print network 100a also includes a number of printers 109 that are coupled to the network 179.

The computer system 103a also includes a number of software components and/or data files that are stored on the memory 156 and are executable or processed by the processor 153. Among these components is an operating system 186 that includes a data communications protocol suite 189 that is employed to communicate with any of the printers 109 over the network 179. In addition, one or more applications 113a are included in the memory 156 and are used to generate one or more documents 116a. The computer system 103a also includes a generic print driver 119a, a port monitor 123a, and a print router 126a that are software embodiments of the generic print driver 119 (FIG. 1), the port monitor 123 (FIG. 1), and the print router 126 (FIG. 1), respectively. The generic print driver 119a generates a print ready file 129a that is stored in a predefined location in the memory 156 by the port monitor 123a.

During operation, the print router 126a may create one or more user interfaces 113a that are displayed on the display device 163. The generic print driver 119a, port monitor 123a, and the print ready file 123a provide for the dynamic print path 106 within the computer system 103a to be able to print the document 116a on any one of the printers 109 coupled to the network 179. In this respect, the print router 126a provides the user with an ability to select one of the printers 109a for printing by virtue of a user interface 133a displayed on the display device 163. The generic print driver 119a renders the document 116a into the print ready file 129a without a specification of one of the printers 109 upon which the document 116a is to be printed. The user may specify the desired printer 109 upon which document 116a is to be printed by manipulating the keyboard 169, the mouse 173, or other input device as can be appreciated by those with ordinary skill in the art.

The network 179 includes, for example, the Internet, intranets, wide area networks (WANs), local area networks, wireless networks, ad-hoc networks, or other suitable networks, etc., or any combination of two or more such networks.

The memory 156 is defined herein as both volatile and nonvolatile memory and data storage components. Volatile components are those that do not retain data values upon loss of power. Nonvolatile components are those that retain data upon a loss of power. Thus, the memory 156 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 153 may represent multiple processors and the memory 156 may represent multiple memories that operate in parallel. In such a case, the local interface 159 may be an appropriate network that facilitates communication between any two of the multiple processors, between any processor and any one of the memories, or between any two of the memories etc. The processor 153 may be electrical, optical, or molecular in nature.

The operating system 186 is executed to control the allocation and usage of hardware resources in the computer system 103a such as the memory, processing time and peripheral devices. In this manner, the operating system 186 serves as the foundation on which applications depend as is generally known by those with ordinary skill in the art.

Figure 3:
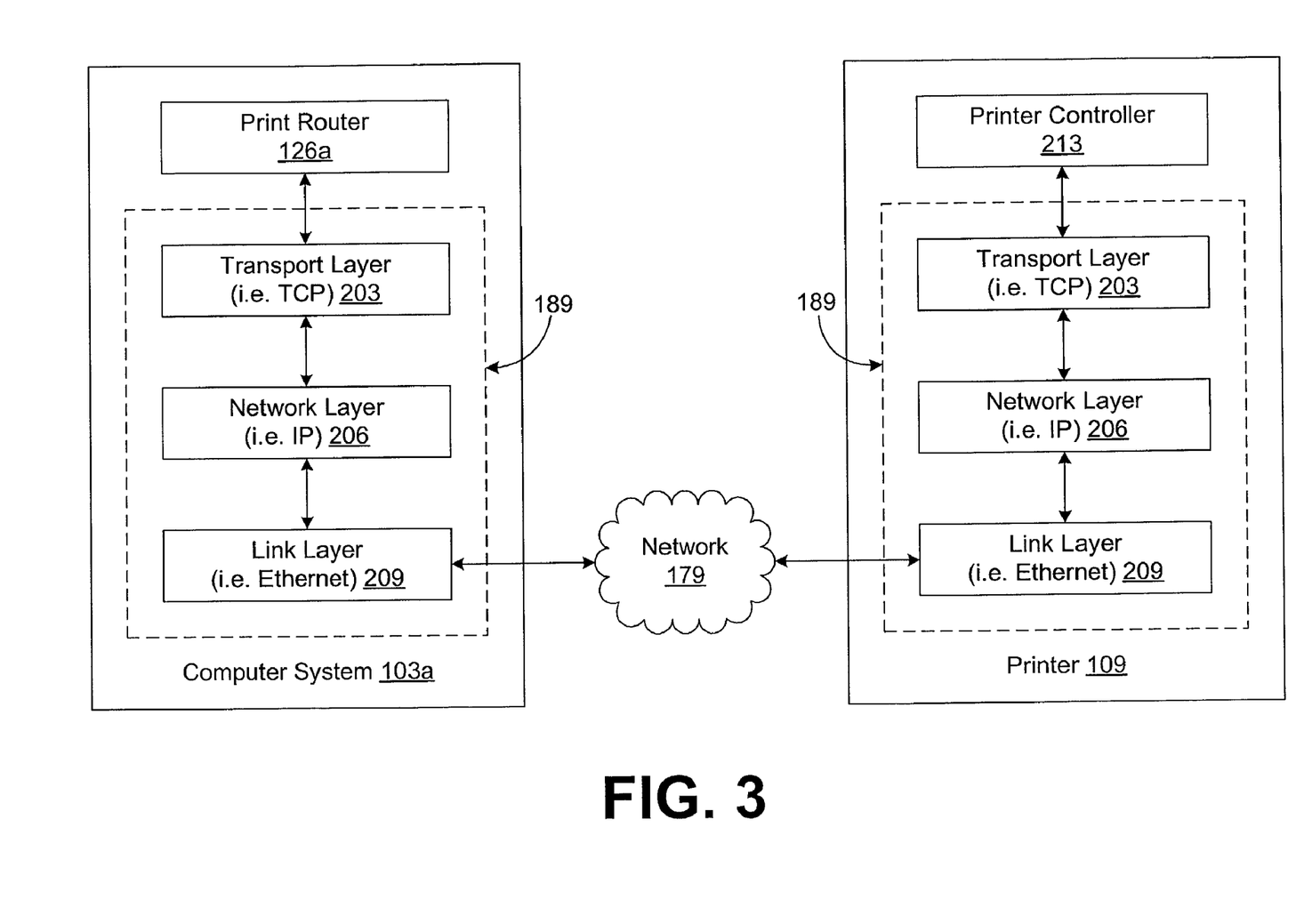
FIG. 3 is a functional block diagram that shows a data communication protocol suite employed to facilitate communication between a computer system and a printer in the network of FIG. 2.

With reference to FIG. 3 shown is a view of the print network 100a that shows an example of the data communications protocol suite 189 as employed between the computer system 103a and a select one of the printers 109. The data communications protocol suite 189 facilitates direct communication of the print ready file 129a from the computer system 103a to a select one of the printers 109 without the intervention of a print server or other intermediate device. The data communications protocol suite 189 includes a transport layer 203, a network layer 206, and a link layer 209. The same protocol suite 189 is employed on the printer 109 as well.

The transport layer 203 may comprise, for example, a Transmission Control Protocol (TCP). The network layer 206 may employ, for example, an Internet Protocol (IP). The link layer protocol 209 may employ an Ethernet network or other network technology. The print router 126a directs the data communications protocol suite 189 to communicate the print ready file 129a to the printer 109. The data communications protocol suite 189 located in the printer 109 provides the print ready file 129 to a printer controller 213 that orchestrates the printing of the document 116a embodied therein.

Figure 4:
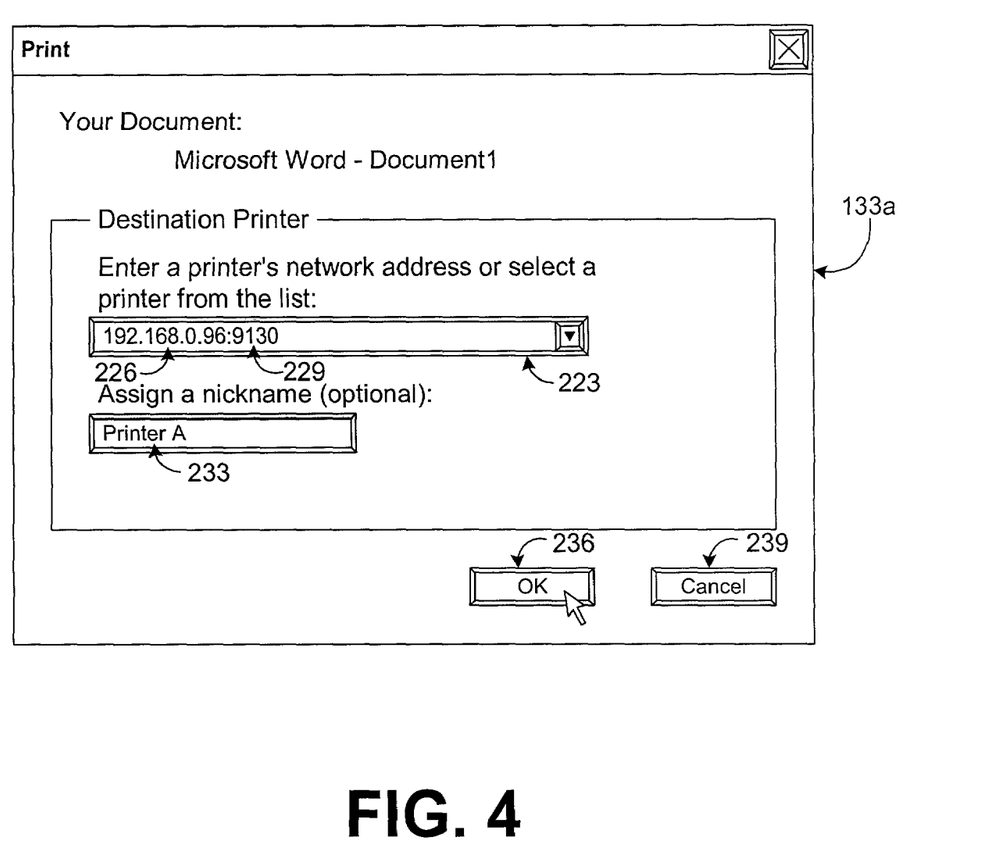
FIG. 4 is a drawing of a user interface generated by a print router employed in the computer system of FIG. 2 to specify a printer for printing.

Turning then to FIG. 4, shown is the user interface 133a that is generated by the print router 126a (FIG. 2) to provide a user with the opportunity to select or specify a printer 109 (FIG. 2) on a network 179 (FIG. 2) to be used to print the document 116a (FIG. 2). The user interface 133a includes a printer field 223 that includes a drop down list to facilitate a selection of one of a number of predefined printers for printing. Alternatively, a printer designation may be directly entered into the printer field 223. The selected printer 109 may be specified by virtue of an IP address, network alias, or other designation. As shown with reference to FIG. 4, an IP address 226 is employed.

In addition, a user may specify the port within the printer 109 that is to be used to communicate therewith. The port is specified by appending a port identifier 229 onto the printer designation, although it may be possible that the port identifier 229 be designated in another manner such as with a separate field, etc. The user may specify a nickname in a nickname field 233 to represent a printer 109 that is entered into the printer field 223. After the nickname is entered, it is included in the drop down list associated with the printer field 223 for selection in the future. Once the appropriate printer 109 has been entered or selected, then the user may manipulate the "OK" button 236 to cause the printing of the document 116a on the selected or specified printer 109. Alternatively, the user may manipulate the cancel button 239 to cancel the print job.

Figure 5:
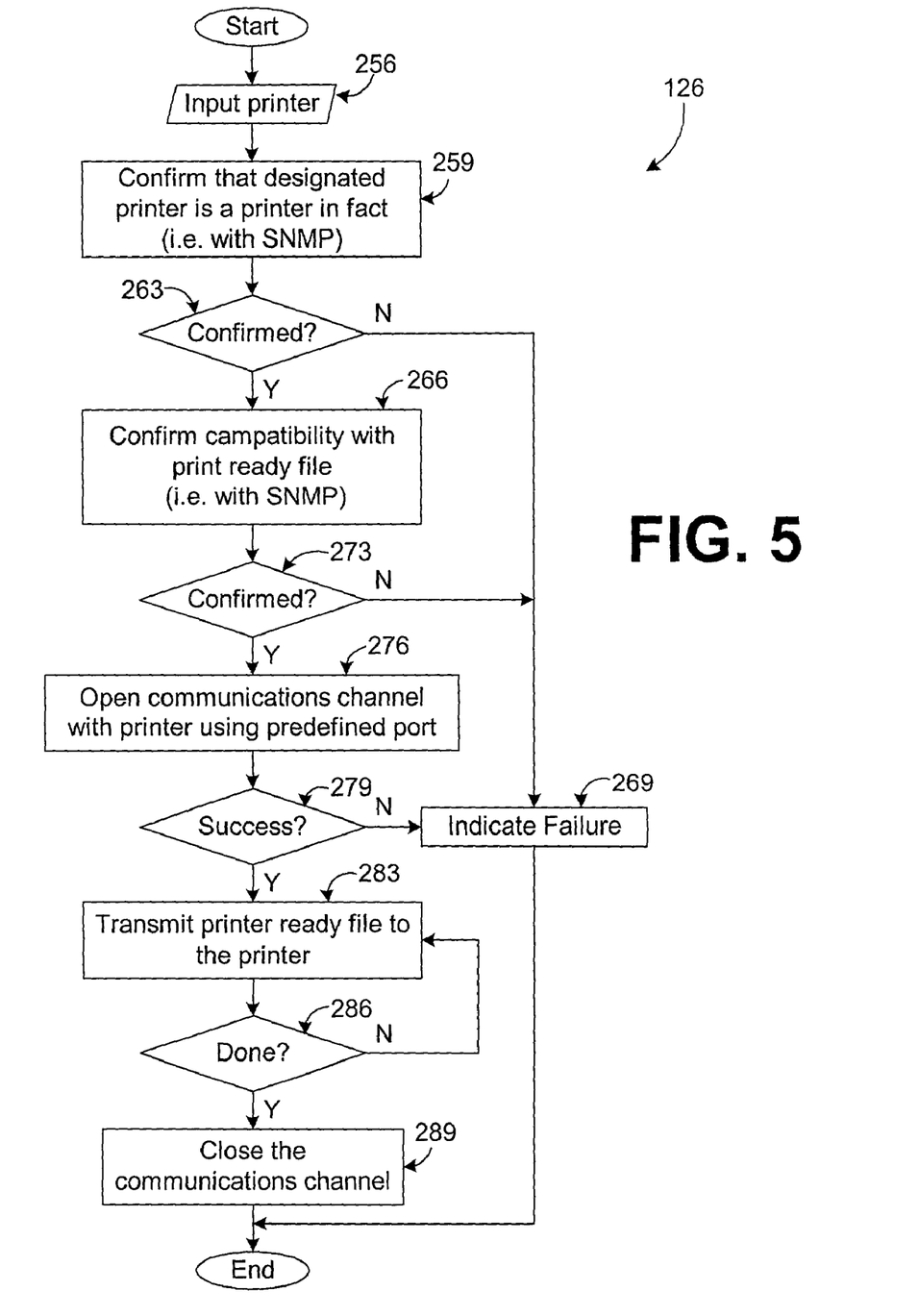
FIG. 5 is a flow chart that depicts the functionality of the print router employed in FIGS. 1 or 2.

Referring next to FIG. 5, shown is a flow chart of the print router 126/126a according to an embodiment of the present invention. Alternatively, the flow chart of FIG. 5 may viewed as depicting steps of a method implemented in the computer system 103 (FIG. 1) in order to provide a dynamic print path 106 (FIG. 1) for printing document 116 (FIG. 1) on a specified printer 109 (FIG. 1).

The print router 126/126a is implemented, for example, by the port monitor 123/123a (FIG. 1/FIG. 2) after the print ready file 129/129a (FIG. 1/FIG. 2) has been created by the generic print driver 119/119a (FIG. 1/FIG. 2) and stored in the memory 156 (FIG. 2). Alternatively, the operation of the print router 126/126a may be implemented at another point in time during the print operation.

Beginning with box 256, the print router 126/126a obtains an input that indicates a selection of a desired printer 109 to which the document 116 is to be printed. To obtain the input, the user interface 133 (FIG. 1) may be generated to facilitate a user selection or specification of the destination printer 109 from a group of potential destination printers or some other approach may be employed. Then, in box 259, the print router 126/126a confirms that the chosen printer 109 is a printer in fact. This may be done by generating and transmitting a query to the respective printer 109 to determine whether such device is in fact a printer. To create and transmit such a query, the Simple Network Management Protocol (SNMP) may be employed. In box 263, if the selected or specified printer 109 is confirmed to be a printer 109 then the print router 126/126a proceeds to box 266. Otherwise, in box 269 an indication of a print failure is made to the user through an appropriate user interface 133. Thereafter, the print router 126/126a ends as shown.

Assuming that the destination printer 109 has been confirmed to be a printer in box 263, then in box 266 the print router 126/126a next confirms that the destination printer 109 employs a print ready format that is compatible with the print ready format of the print ready file 129 (FIG. 1). This may be determined by transmitting an appropriate query to the destination printer 109 using SNMP or other appropriate protocol. Thereafter, in box 273, if the designated printer 109 employs a print ready format that is compatible with the print ready format of the print ready file 129, then the print router 126/126a proceeds to box 276. Otherwise, the print router 126/126a moves to box 269 to indicate the failure of the print job due to incompatibility. Alternatively, the print ready file 129 may be applied to an appropriate translator that translates the print ready file 129 into a print ready format that is compatible with the current destination printer 109. Thereafter, the print router 126/126a would proceed to box 283.

In box 276, the print router opens a communications channel with the destination printer. This may be done, for example, by opening a socket with the destination printer using a predefined port. Thereafter, in box 279 if the connection has been successfully made, then the print router proceeds to box 283. In box 283, the printer ready file 129 is transmitted to the printer using the data communications protocol suite 189 (FIG. 1) or other appropriate protocol suite. In this respect, the print ready file is transmitted directly from the computer system 103 to the printer 109 without the intervention of a print server or other intermediate device. In box 286, the print router 126/126a determines whether the transmission of the print ready file 129 is complete. If such is the case, then the print router 126/126a proceeds to box 289. Otherwise, the print router 126/126a reverts back to box 283 to continue to transmit the print ready file 129 to the printer 109. In box 289, the print router 126/126a closes the communications channel with the destination printer 109 as the communication of the print ready 129 file is complete. This may be done, for example, by closing the open socket. Thereafter, the print router 126/126a is inactive.

Although one embodiment of the dynamic print path 106 is shown as being embodied in software or code executed by general purpose hardware in the computer system 103a, as an alternative the dynamic print path 106 may also be embodied in dedicated hardware or a combination of software/general purpose hardware and dedicated hardware. If embodied in dedicated hardware, the dynamic print path 106 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams of FIGS. 1-3 and/or the flow chart of FIG. 5 show various embodiments of the architecture, functionality, and operation of an implementation of the dynamic print path 106. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagrams of FIGS. 1-3 and/or the flow chart of FIG. 5 show a specific order of execution, it is understood that the order of execution may differ from that which is depicted. For example, the order of execution of two or more blocks may be scrambled relative to the order shown. Also, two or more blocks shown in succession in FIGS. 1, 3, and 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the dynamic print path 106 is implemented in software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the dynamic print path 106 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method for printing using a dynamic print path, comprising:
   rendering a document in a computer system into a print ready file without a specification of a destination printer upon which the document is to be printed, wherein the print ready file is embodied in a format printable by the destination printer without further rendering operations;
   specifying the destination printer to which the print ready file is to be transmitted to print the document by specifying an Internet Protocol (IP) address of the destination printer on a network;
   querying the destination printer at the IP address on the network to confirm that the destination printer is a printer in fact;
   querying the destination printer to ascertain whether a print ready format of the print ready file is compatible with a required print ready format of the destination printer; and
   transmitting the print ready file from the computer system directly to the destination printer using a predefined communications protocol.

2. The method of claim 1, wherein the transmitting of the print ready file from the computer system directly to the destination printer using the predefined communications protocol further comprises opening a socket with the destination printer.

3. The method of claim 1, wherein the specifying of the destination printer to which the print ready file is to be transmitted to print the document further comprises specifying a port to be employed for data communication with the destination printer.

4. The method of claim 1, wherein the specifying of the destination printer to which the print ready file is to be applied to print the document is performed after the rendering of the document in the computer system into the print ready file without the specification of the destination printer upon which the document is to be printed.

5. The method of claim 1, wherein the specifying of the destination printer to which the print ready file is to be applied to print the document further comprises selecting the destination printer from a group of potential destination printers.

6. The method of claim 1, wherein the specifying of the destination printer to which the print ready file is to be applied to print the document further comprises generating a user interface to facilitate a user specification of the destination printer.

7. The method of claim 1, wherein the transmitting of the print ready file from the computer system directly to the destination printer using the predefined communications protocol further comprises transmitting the print ready file from the computer directly to the destination printer across a network using a Transmission Control Protocol/Internet Protocol (TCP/IP).

8. The method of claim 1 wherein the rendering of the document in the computer system into the print ready file without the specification of the destination printer upon which the document is to be printed further comprises rendering the document into the print ready format with a generic printer driver.

9. The method of claim 8, further comprising:
   providing a port monitor that is in data communication with the generic printer driver; and
   writing the print ready file rendered by the generic printer driver to a memory with the port monitor.

10. The method of claim 9, further comprising:
    providing a print router that is in data communication with the port monitor; and
    using the print router to direct the transmission of the print ready file from the computer system directly to the destination printer using the predefined communications protocol.

11. A computer readable medium storing a computer program to provide for a dynamic print path for printing, comprising:
    a generic printer driver that renders a document into a print ready file without a specification of a destination printer upon which the document is to be printed, wherein the print ready file is embodied in a format printable by the destination printer without further rendering operations;
    a port monitor that writes the print ready file rendered by the generic printer driver to a memory to be transmitted to the destination printer; and
    a print router that facilitates specifying the destination printer from a number of potential destination printers to which the print ready file is to be transmitted to print the document by inputting an Internet Protocol (IP) address of the destination printer on a network, and the print router being capable of directing a data communications protocol suite to transmit the print ready file directly to the destination printer for printing; and
    the print router further comprising: p2 code that queries the destination printer to confirm that the destination printer identified is a printer in fact; and
        code that queries the destination printer to ascertain whether a print ready format of the print ready file is compatible with the required print ready format of the destination printer.

12. The program embodied in a computer readable medium of claim 11, wherein the print router further comprises code that requests the opening of a socket in the destination printer to facilitate direct communication with the destination printer over a network.

13. The program embodied in a computer readable medium of claim 11, wherein the print router further comprises code that facilitates an inputting of a port to be employed in communicating with the destination printer.

14. The program embodied in a computer readable medium of claim 11, wherein the printer router further comprises code that facilitates specifying the destination printer from the number of potential destination printers to which the print ready file is to be transmitted to print the document after the document has been rendered into the printer ready file.

15. The program embodied in a computer readable medium of claim 11, wherein the printer router further comprises code that generates a user interface to facilitate a user specification of the destination printer.

16. The program embodied in a computer readable medium of claim 11, wherein the data communications protocol suite further comprises a Transmission Control Protocol/Internet Protocol (TCP/IP).

17. A system that provides for a dynamic print path, comprising:
  means for rendering a document into a print ready file without a specification of a destination printer upon which the document is to be printed, wherein the print ready file is embodied in a format printable by the destination printer without further rendering operations;
  means for writing the print ready file to a memory for temporary storage before transmission to the destination printer;
  means for specifying the destination printer to which the print ready file is to be transmitted to print the document by specifying an Internet Protocol (IP) address of the destination printer on a network;
  means for querying the destination printer at the IP address on the network to confirm that the destination printer is a printer in fact;
  means for querying the destination printer to ascertain whether a print ready format of the print ready file is compatible with a required print ready format of the destination printer; and
  means for transmitting the print ready file directly to the destination printer using a predefined communications protocol.

18. The system of claim 17, wherein the means for specifying the destination printer to which the print ready file is to be applied to print the document further comprises means for specifying the destination printer after the document has been rendered into the print ready file.

19. The system of claim 17, wherein the means for specifying the destination printer to which the print ready file is to be applied to print the document further comprises means for obtaining a user input that identifies the destination printer.

20. The system of claim 17, wherein the means for rendering the document into a print ready file without a specification of a destination printer upon which the document is to be printed further comprises a generic printer driver.

21. The system of claim 20, wherein the means for writing the print ready file to the memory for temporary storage before transmission to the destination printer further comprises a port monitor that is in data communication with the generic printer driver.

22. A system that provides for a dynamic print path with which to interface with a destination printer to print a document, comprising:
  a processor circuit having a processor and a memory; and
  the dynamic print path being stored in the memory and executable by the processor, the dynamic print path comprising:
    a generic printer driver that renders a document into a print ready file without a specification of a destination printer upon which the document is to be printed, wherein the print ready file is embodied in a format printable by the destination printer without further rendering operations;
    a port monitor that writes the print ready file rendered by the generic printer driver to a memory to be transmitted to the destination printer; and
    a print router that facilitates specifying the destination printer from a number of potential destination printers by specifying an Internet Protocol (IP) address of the destination printer on a network to which the print ready file is to be transmitted to print the document, the print router being configured to query the destination printer at the IP address on the network to confirm that the destination printer is a printer in fact, and to query the destination printer to ascertain whether a print ready format of the print ready file is compatible with a required print ready format of the destination printer.

23. The system of claim 22, further comprising a data communications protocol suite stored in the memory and executable by the processor that is capable of transmitting the print ready file directly to the destination printer for printing at the direction of the printer router.

24. The system of claim 22, wherein the print router further comprises logic that facilitates an inputting of a port with which to communicate with the destination printer.

25. The system of claim 22, wherein the printer router further comprises logic that facilitates specifying the destination printer from the number of potential destination printers to which the print ready file is to be transmitted to print the document after the document has been rendered into the printer ready file.

26. The system of claim 22, wherein the printer router further comprises logic that generates a user interface to facilitate a user specification of the destination printer.

27. The system of claim 23, wherein the data communications protocol suite further comprises a Transmission Control Protocol/Internet Protocol (TCP/IP).

* * * * *

UNITED STATES PATENT AND TRADEMARK OFFICE
CERTIFICATE OF CORRECTION

| | | |
|---|---|---|
| PATENT NO. | : 7,298,509 B2 | Page 1 of 1 |
| APPLICATION NO. | : 10/102259 | |
| DATED | : November 20, 2007 | |
| INVENTOR(S) | : Patrick O. Sandfort et al. | |

It is certified that error appears in the above-identified patent and that said Letters Patent is hereby corrected as shown below:

In column 10, line 49, in Claim 11, after "comprising:" delete "p2".

Signed and Sealed this

Twentieth Day of May, 2008

JON W. DUDAS
*Director of the United States Patent and Trademark Office*